United States Patent
Nanji (10) Patent No.: US 7,054,321 B1
(45) Date of Patent: May 30, 2006

(54) TUNNELING ETHERNET

(75) Inventor: Suhail Nanji, San Jose, CA (US)

(73) Assignee: Redback Networks Inc., San Jose, CA (US)

( * ) Notice: Subject to any disclaimer, the term of this patent is extended or adjusted under 35 U.S.C. 154(b) by 977 days.

(21) Appl. No.: 09/699,198

(22) Filed: Oct. 27, 2000

(51) Int. Cl.
*H04L 12/28* (2006.01)

(52) U.S. Cl. .................................... 370/401; 370/352

(58) Field of Classification Search ........... 370/395.52, 370/395.53, 434, 465, 469, 473, 474, 328, 370/338, 349, 351, 352, 354, 389, 392, 396, 370/400, 401, 402, 403, 404, 353, 355, 356, 370/386

See application file for complete search history.

(56) References Cited

U.S. PATENT DOCUMENTS

| | | | | |
|---|---|---|---|---|
| 6,094,437 A | * | 7/2000 | Loehndorf et al. | 370/420 |
| 6,366,561 B1 | * | 4/2002 | Bender | 370/238 |
| 6,452,920 B1 | * | 9/2002 | Comstock | 370/349 |
| 6,473,798 B1 | * | 10/2002 | Grosser et al. | 709/224 |
| 6,487,689 B1 | * | 11/2002 | Chuah | 714/748 |
| 6,522,627 B1 | * | 2/2003 | Mauger | 370/230 |
| 6,529,479 B1 | * | 3/2003 | Suzuki | 370/236.1 |
| 6,654,808 B1 | * | 11/2003 | Chuah | 709/227 |
| 6,732,314 B1 | * | 5/2004 | Borella et al. | 714/752 |
| 6,801,509 B1 | * | 10/2004 | Chuah et al. | 370/328 |
| 2002/0038419 A1 | * | 3/2002 | Garrett et al. | 713/154 |

OTHER PUBLICATIONS

TECHFEST.COM, Techfest Ethernet Technical Summary, 2.0 Ethernet Frame Structure, www.techfest.com/networking/lan/ethernet3.htm, copyright 1999 Techfest.com.
TECHFEST.COM, Techfest Ethernet Technical Summary, , 3.0 Ethernet Media Access Control, www.techfest.com/networking/lan/ethernet3.htm, copyright 1999 Techfest.com.
W. Townsley, A. Valencia, A. Rubens, G. Pall, G. Zorn, and B. Palter, Layer Two Tunneling Protocol "L2TP", pp., 1-69, RFC 2661, The Internet Society, Aug. 1999.
Redback Networks, Inc., *Access Operating System (AOS) Configuration Guide* Release 2.3, Copyright 1998-1999, 14 pgs.
Redback Networks, Inc., *Access Operating System (AOS) Configuration Guide* Release 3.1, Copyright 1998-1999, 15 pgs.
Redback Networks, Inc., *Access Operating System (AOS) Command Reference* Release 3.1, Copyright 1998-1999, 23 pgs.
Redback Networks, Inc., *Release Notes for Redback AOS*, Release 3.1.4, Copyright 1998-1999, 4 pgs.

* cited by examiner

*Primary Examiner*—Phirin Sam
(74) *Attorney, Agent, or Firm*—Blakely, Sokoloff, Taylor & Zafman LLP (57) ABSTRACT

A machine readable medium for tunneling Ethernet is described. A machine readable medium comprises receiving an Ethernet frame and transmitting the Ethernet frame over a non-homogenous tunnel, the tunnel distinguishing subscriber traffic.

30 Claims, 6 Drawing Sheets

TUNNELING ETHERNET

BACKGROUND OF THE INVENTION

1. Field of the Invention

This invention relates to the area of communication networks. More specifically, the present invention relates to preserving Ethernet frames across a network.

2. Description of the Related Art

Ethernet headers contain useful data. For example, the source address can be used for network analysis, tracing, billing and accounting purposes. Ethernet frames can be tunneled with the Bridge Encapsulation Protocol (BCP) and the Generic Routing Protocol (GRE).

Figure 1:
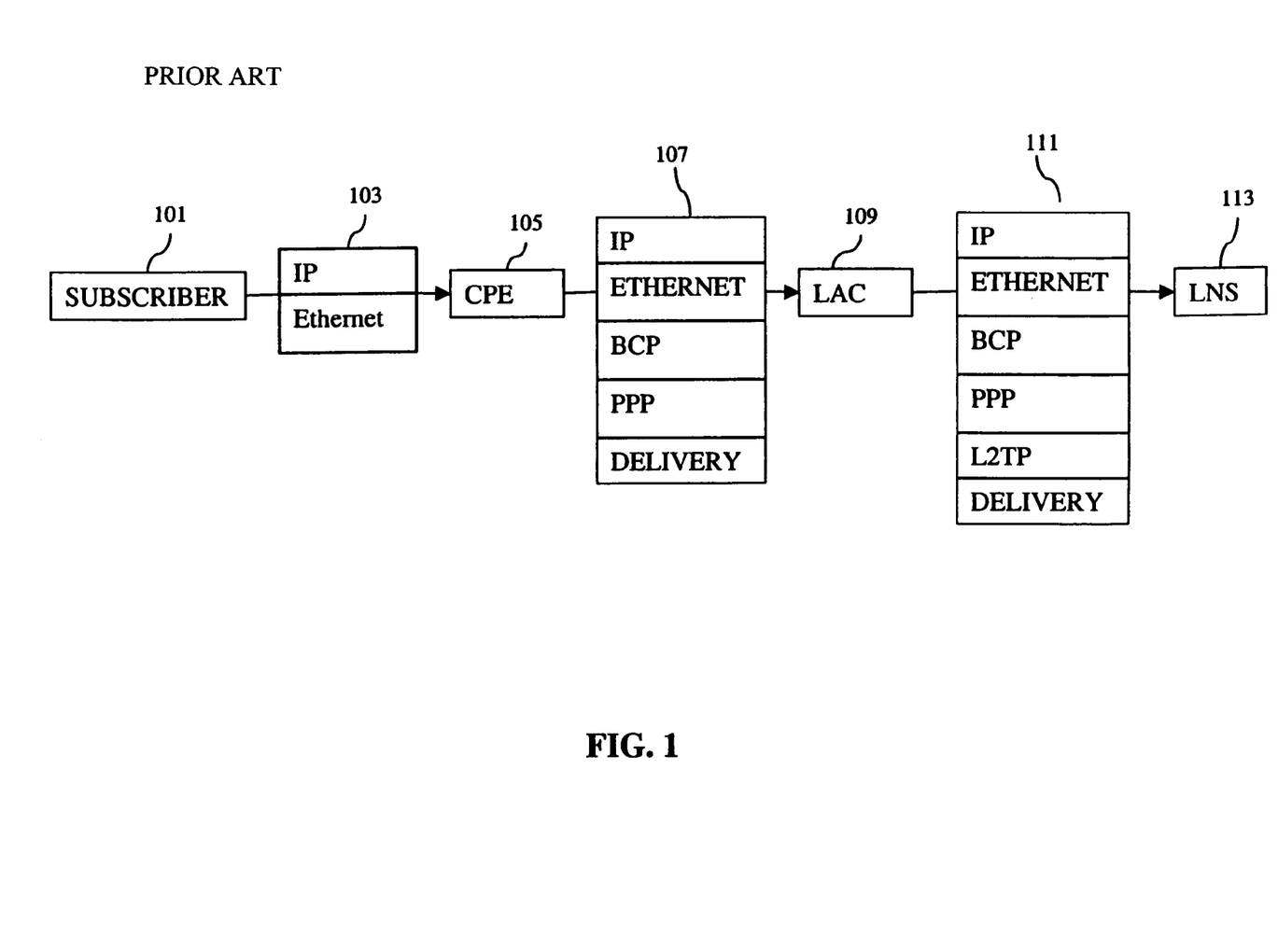
FIG. 1 (Prior Art) is a diagram of transmitting an Ethernet frame with Bridge Control Protocol (BCP) encapsulation.

FIG. 1 (Prior Art) is a diagram of transmitting an Ethernet frame with Bridge Control Protocol (BCP) encapsulation. The subscriber's machine 101 (e.g. personal computer (PC)) runs the Internet Protocol (IP) and Ethernet. Data packets are prepared for transmittal to the Internet by prepending IP headers. The subscriber's machine 101 also prepends Ethernet headers onto the data packets to be transmitted. The encapsulation of the data is represented by the protocol stack 103. An encapsulated data packet is transmitted to the customer premise equipment (CPE) 105, such as a cable modem or digital subscriber line (DSL) modem. To preserve the Ethernet frame with BCP, the CPE 105 must run BCP and the Point to Point Protocol (PPP). The CPE 105 encapsulates the data from the subscriber machine 103 with BCP and then PPP. The CPE further prepares the data for transmission by encapsulating the data in delivery protocols (such as 1483 or 1490 bridged circuit over Asynchronous Transmission Mode (ATM), Frame Relay, etc) as indicated by the protocol stack 107. The protocol stack 107 is transmitted to a network element 109. The network element may support BCP and PPP to decapsulate the data packet. The network element 109 is configured as a Layer 2 Tunneling Protocol (L2TP) Access Concentrator (LAC) in order to tunnel the stack or data packet. The LAC 109 encapsulates the data packet with L2TP as indicated by the stack 111 for transmission to an L2TP Network Server (LNS) 113. The LNS 113 must support PPP and BCP to decapsulate the data packet.

Figure 2:
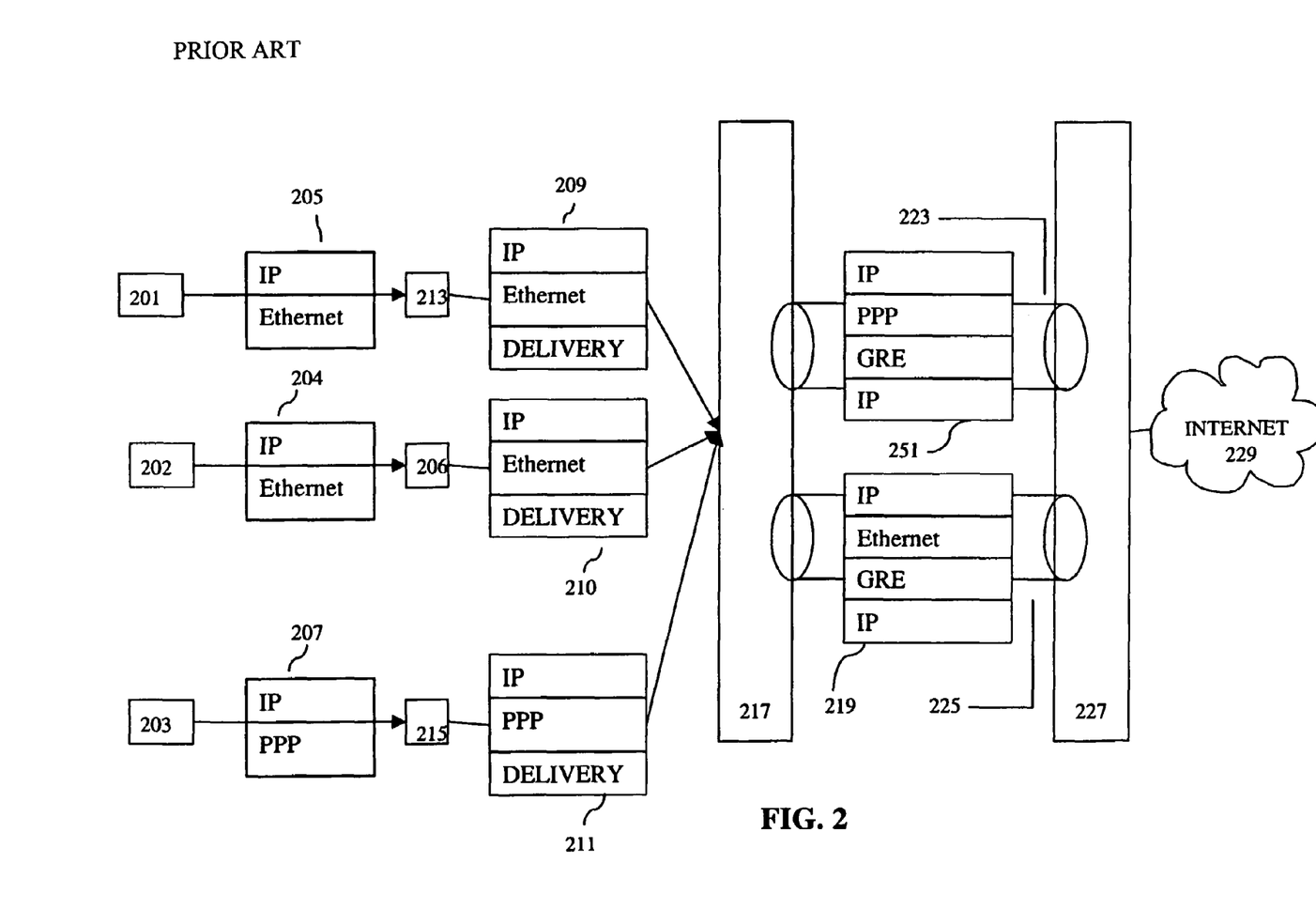
FIG. 2 (Prior Art) is a diagram of transmitting traffic from multiple subscribers who use different protocols with multiple Generic Routing Encapsulation (GRE) tunnels.

FIG. 2 (Prior Art) is a diagram of transmitting traffic from multiple subscribers who use different protocols with multiple Generic Routing Encapsulation (GRE) tunnels. Two individual subscribers 201, 202 connect to two separate CPEs 213, 206. The traffic transmitted from the subscribers 201, 202 to the CPEs 213, 206 are IP encapsulated with Ethernet as indicated by the protocol stacks 205, 204. The CPEs 213, 206 encapsulate the subscriber traffic in a delivery protocol, as indicated by the protocol stacks 209 and 210, and transmit the traffic to a network element 217. Another subscriber 203 transmits traffic to a CPE 215 encapsulated with Point to Point protocol as indicated by the protocol stack 207 showing IP over PPP. The CPE 215 encapsulates the subscriber traffic in a delivery protocol as indicated by the protocol stack 211 and transmits the traffic to a network element 217. The network element 217 uses GRE to tunnel the traffic from subscribers 201, 202, and 203 to another network element 227. The network element 217 establishes 2 different tunnels 223, 225 with the network element 227. One tunnel 223 carries both subscribers' Ethernet traffic. The Ethernet traffic is indicated by the protocol stack 221. The other tunnel 225 carries the PPP subscriber traffic indicated by the protocol stack 219. Both GRE tunnels must be transmitted by IP media also indicated by stacks 221 and 219. The network element 227 terminates the tunnels 223, 225 and routes the traffic to the Internet 229.

Although BCP can be employed to transmit an Ethernet frame, it is an inefficient method. Both PPP and BCP must be supported on the network elements processing BCP data packets. In addition to the network elements, the CPE must also support BCP which is atypical. Moreover, BCP support is in addition to whatever tunneling protocol is to be used. Utilizing GRE to transmit Ethernet frames presents a more efficient and simple method than BCP, but GRE does not have the robust signaling integral to L2TP. Customers requesting certain information passed as attribute values pairs (AVPs) in L2TP lose the option of receiving such information with GRE.

SUMMARY OF THE INVENTION

The invention provides an apparatus and method for transmitting Ethernet data. According to one aspect of the invention, a method provides for transmitting Ethernet frames over a tunneling protocol.

In one embodiment of the invention, an Ethernet frame is received and transmitted over a non-homogenous tunnel, the tunnel having a plurality of sessions. Requested values are also transmitted over the non-homogenous tunnel.

In an alternative embodiment of the invention, Ethernet data included in an Ethernet frame is transmitted over a non-homogenous L2TP tunnel to a service provider. Upon receiving the Ethernet data, the service provider analyzes the Ethernet data.

In another embodiment of the invention, an Ethernet frame is encapsulated with L2TP, transmitted over a network, and decapsulated. The Ethernet frame is transmitted on one of a plurality of sessions in a non-homogenous tunnel running over the network. Attribute value pairs (AVPs) are transmitted over the session in relation to the encapsulated Ethernet frame.

These and other aspects of the present invention will be better described with reference to the Detailed Description of the Preferred Embodiment and the accompanying Figures.

BRIEF DESCRIPTION OF THE DRAWINGS

The invention may best be understood by referring to the following description and accompanying drawings that are used to illustrate embodiments of the invention. In the drawings.

The invention may best be understood by referring to the following description and accompanying drawings that are used to illustrate embodiments of the invention. In the drawings.

DETAILED DESCRIPTION OF THE DRAWINGS

The present invention provides for a method and apparatus for transmitting Ethernet frames across a network. In the following description, numerous specific details are set forth to provide a thorough understanding of the invention. However, it is understood that the invention may be practiced without these specific details. In other instances, well-known protocols, structures and techniques have not been shown in detail in order not to obscure the invention.

Figure 3:
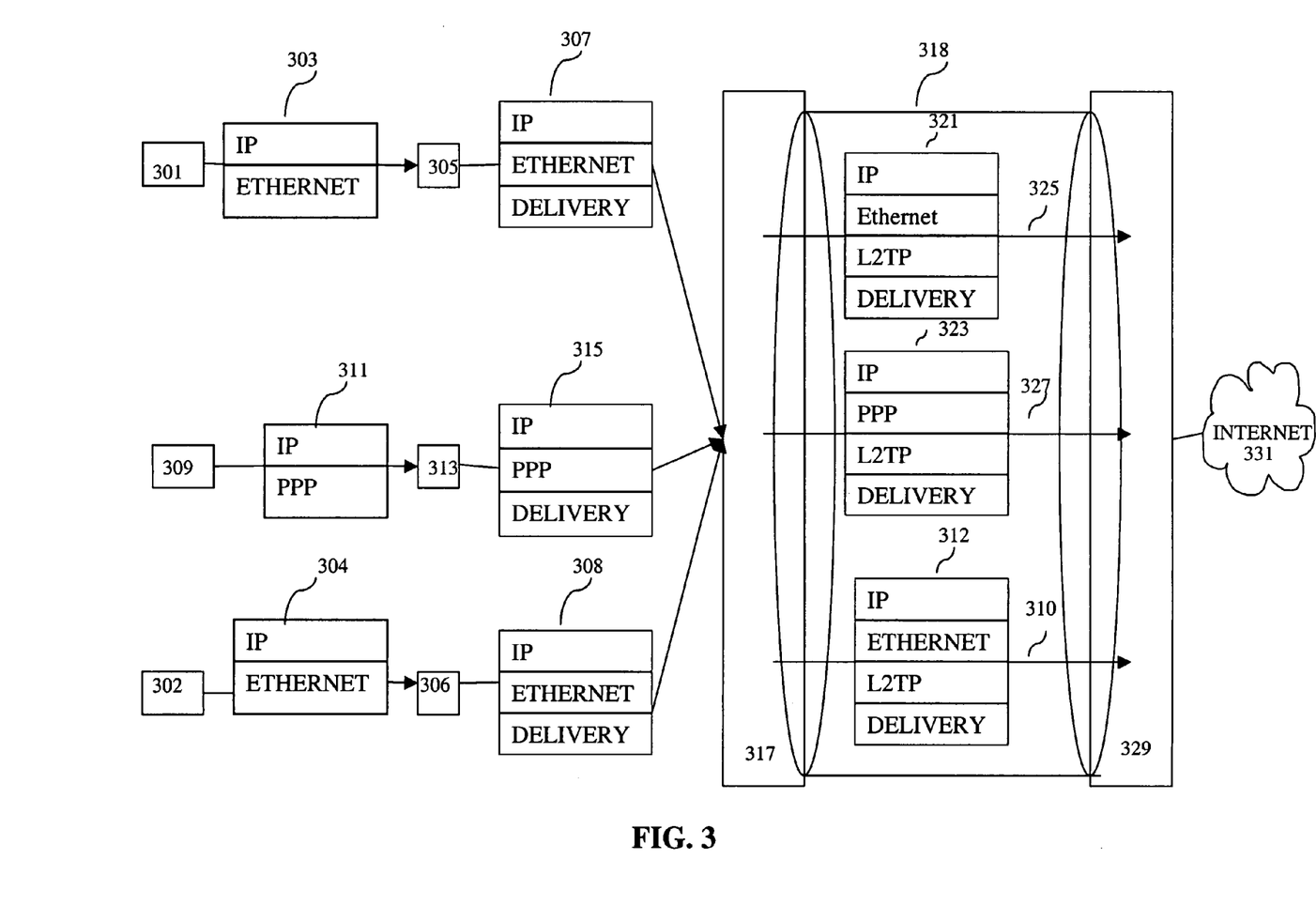
FIG. 3 is a diagram of transmitting traffic from multiple subscribers who use different protocols over a single Ethernet capable Layer 2 Tunneling Protocol (L2TP) tunnel according to one embodiment of the invention.

FIG. 3 is a diagram of transmitting traffic from multiple subscribers who use different protocols over a single Ethernet capable Layer 2 Tunneling Protocol (L2TP) tunnel according to one embodiment of the invention. Two individual subscribers 301, 302 connect to individual CPEs 305 and 306 with Ethernet. The subscribers transmit IP packets encapsulated with Ethernet as indicated by the protocol stacks 303, 304 to the CPEs 305 and 306. The CPEs 305 and 306 encapsulate the Ethernet traffic with a delivery protocol as indicated by the protocol stacks 307 and 308 and transmit the two stacks to a network element 317. Another subscriber 309 transmits IP packets with PPP as indicated by the protocol stack 311. The subscriber traffic is transmitted to a CPE 313 which encapsulates the traffic with a delivery protocol as indicated by the protocol stack 315. This encapsulated traffic is transmitted to the network element 317. The network element 317 establishes a single L2TP tunnel 318 to a network element 329. The traffic from all three subscribers 301, 309, and 302 are transmitted to the network element 329 over the same non-homogenous tunnel 318, but in separate sessions. The traffic from subscriber 301 represented by the stack 321 is transmitted by session 325. The traffic from subscriber 309 represented by the stack 323 is transmitted by session 327, while the traffic from subscriber 30 2 represented by the stack 312 is transmitted by session 310. The network element 329 transmits traffic to the Internet 331.

As illustrated by FIG. 3 and FIG. 2, transmitting Ethernet with L2TP has multiple advantages over transmitting Ethernet with GRE. GRE must establish homogenous tunnels; a tunnel is established for the subscriber connecting with PPP and a separate tunnel is established for the subscribers using Ethernet. Administration and management of multiple tunnels requires more resources and processing for a network element than maintaining a single tunnel. A single non-homogenous tunnel can be established with the extension to L2TP described herein. Thus, transmitting Ethernet with this extension to L2TP instead of GRE reduces the resource consumption of the network element terminating the tunnel. The network element acting as an L2TP tunnel endpoint uses less resources and can process more traffic than the same network element acting as a GRE tunnel endpoint in situations like that shown in FIG. 3. Exemplary techniques for implementing non-homogenous L2TP tunnels that can carry Ethernet are described in more detail later herein.

Figure 4A:
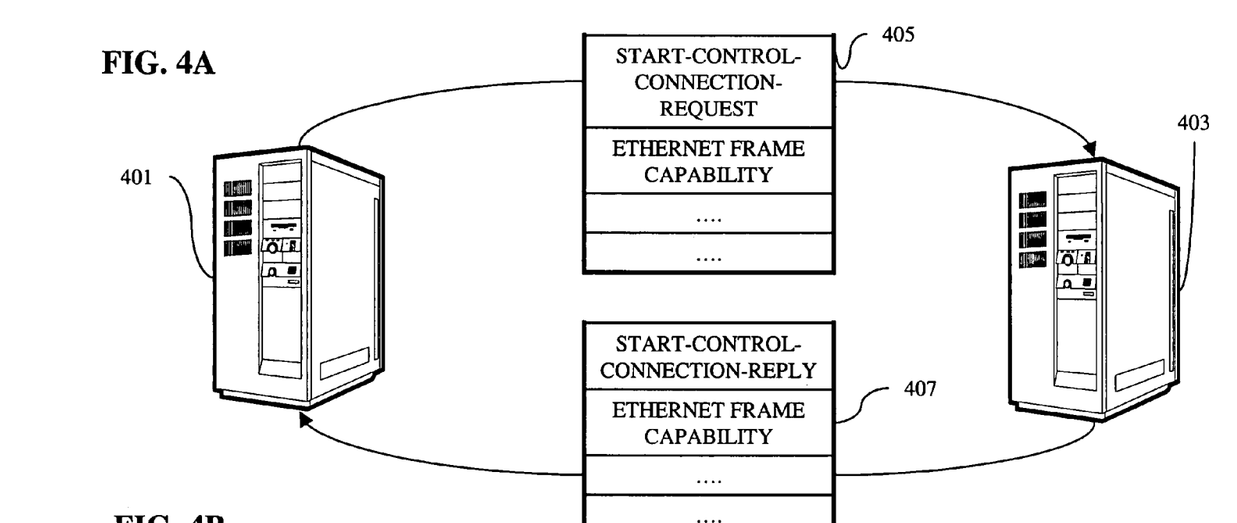
FIG. 4A is a diagram illustrating establishing an Ethernet capable tunnel between a LAC and LNS according to one embodiment of the invention.
Figure 4B:
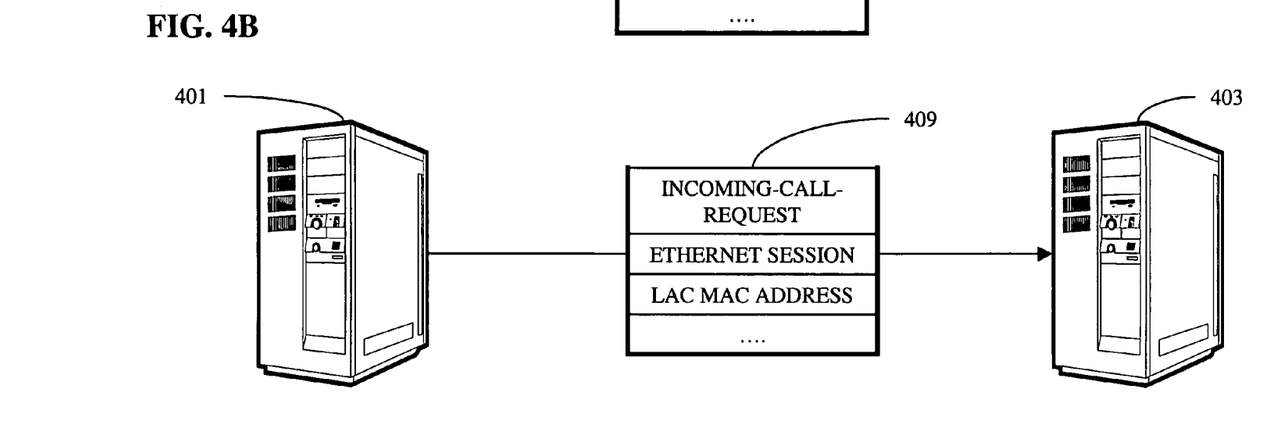
FIG. 4B is a diagram illustrating establishment of an Ethernet over L2TP session between a LAC and LNS according to one embodiment of the invention.

FIGS. 4A–4B are diagrams illustrating establishment of an Ethernet capable tunnel and an Ethernet over L2TP session between a LAC and an LNS. FIG. 4A is a diagram illustrating establishing an Ethernet capable tunnel between a LAC and LNS according to one embodiment of the invention. The LAC 401 creates and transmits an L2TP Start-Control Connection Request (SCCRQ) or tunnel request control message 405 to the LNS 403 for tunnel setup (it is understood that a network element can act as both a LAC and an LNS). The tunnel request control message 405 indicates to the LNS 403 that the LAC might transmit L2TP encapsulated Ethernet frames. The LNS 403 transmits Start-Control-Reply (SCCRP) or a tunnel reply control message 407 to the LAC 401 confirming its ability to process an Ethernet frame. If a tunnel is established between the LAC 401 and the LNS 403, then a session must be established to actually transmit data.

FIG. 4B is a diagram illustrating establishment of an Ethernet over L2TP session between a LAC and LNS according to one embodiment of the invention. The LAC 401 transmits Incoming Call Request (ICRQ) or a session request control message 409 to the LNS 403. The request control message 409 indicates to the LNS that Ethernet frames are being transmitted in the L2TP session and indicates the Ethernet Media Access Control (MAC) Address of the LAC. When the LNS transmits traffic to the subscriber, the LNS uses this MAC address as the source address of the traffic being transmitted to the subscriber. After a session is established between the LAC and LNS, the LAC begins to transmit Ethernet over L2TP data packets to the LNS 403.

Figure 5:
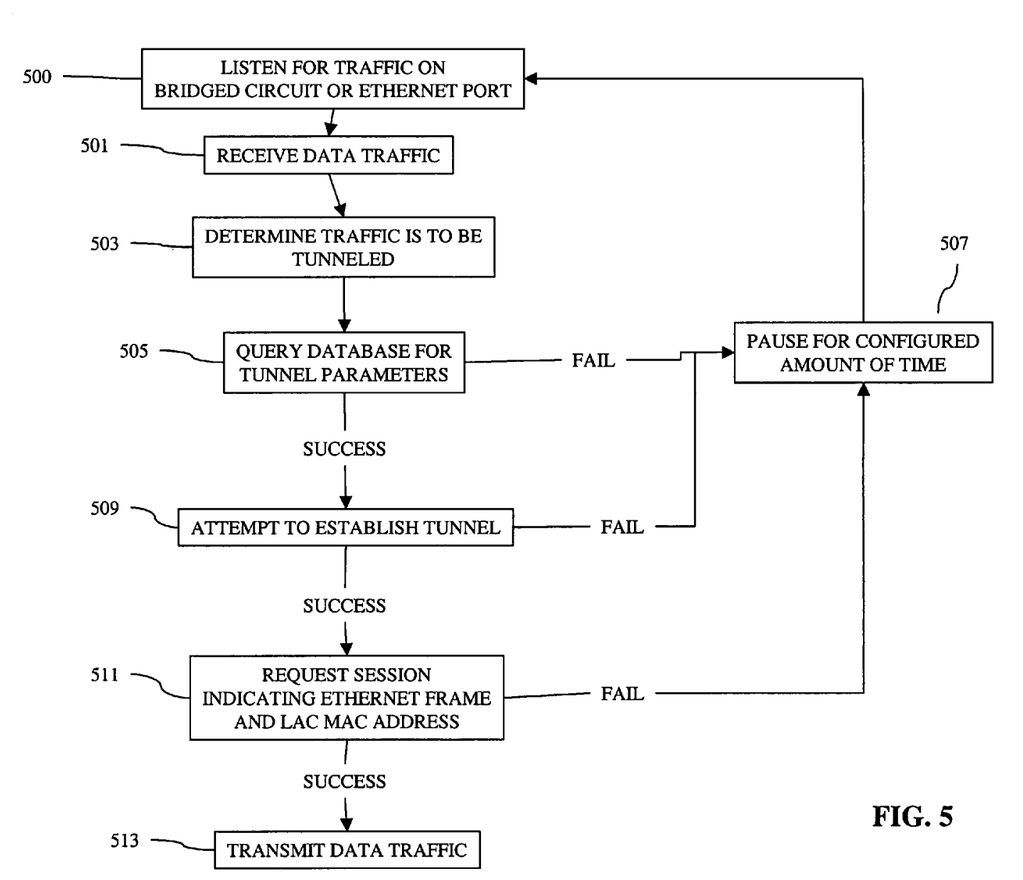
FIG. 5 is a flowchart of a LAC processing traffic according to one embodiment of the invention.

FIG. 5 is a flowchart of a LAC processing traffic according to one embodiment of the invention. At block 500 a LAC listens for traffic on a bridged circuit or Ethernet port. At block 501, the LAC receives traffic on the bridged circuit or Ethernet port. The LAC determines if the received traffic is to be tunneled at block 503. The LAC then queries a database such as RADIUS for tunnel parameters. If a failing event occurs which prevents the LAC from receiving tunnel parameters, then at block 507 the bridged circuit or Ethernet port is paused for a configured amount of time before returning control to block 500. A failing even can include a communication failure between the LAC and the database, the database not finding tunnel parameters, etc. If the LAC does attain tunnel parameters, then at block 509 the LAC attempts to establish a tunnel with an LNS. If the tunnel setup fails, then control goes to block 507. If the tunnel is established, then the LAC requests a session over the tunnel with the LNS and indicates Ethernet and the LAC's MAC address at block 511. If the session setup fails, then control flows to block 507. If session setup is successful, then the LAC begins to transmit the data traffic to the LNS at block 513. Although the described embodiment pauses after all three failing scenarios, alternative embodiments can pause for select failing events or not pause.

Figure 6:
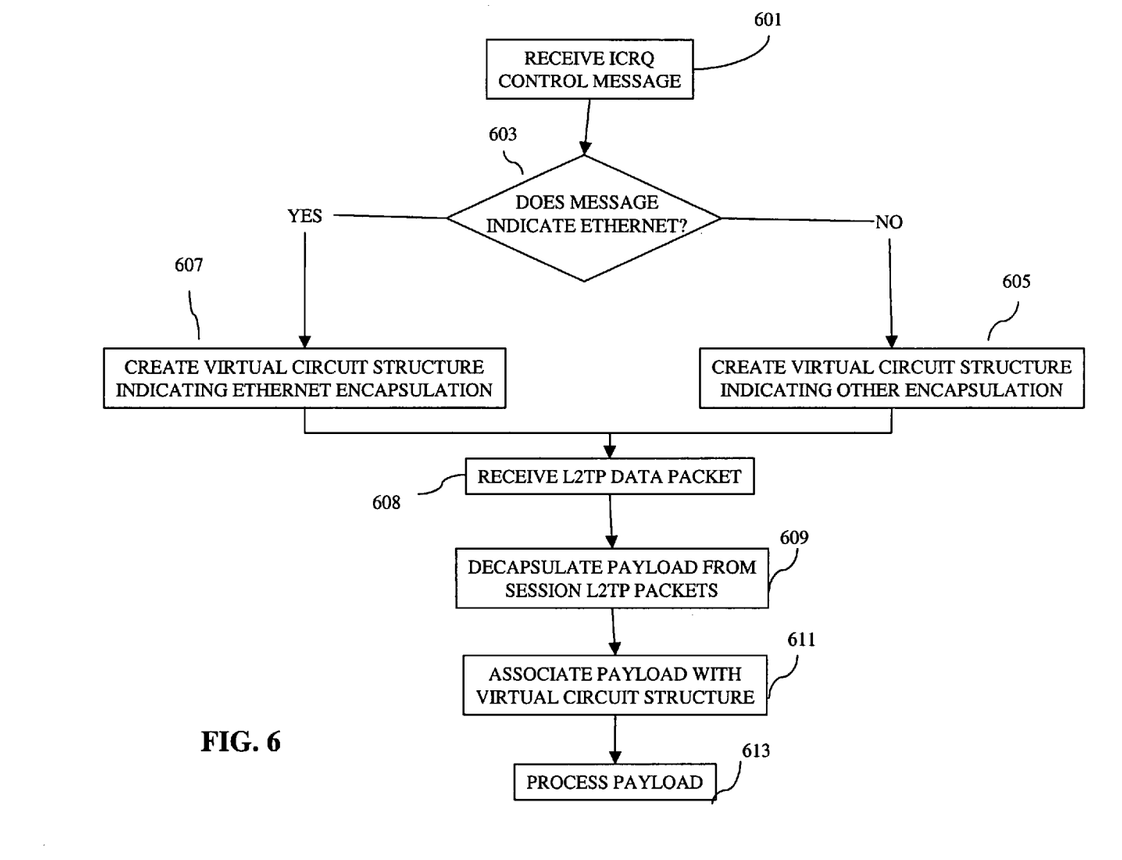
FIG. 6 is a flowchart for processing traffic received from a session in an Ethernet capable L2TP tunnel according to one embodiment of the invention.

FIG. 6 is a flowchart for an LNS processing traffic received over a session in an Ethernet capable L2TP tunnel from a LAC according to one embodiment of the invention. At block 601, an LNS receives an Incoming-Call-Request (ICRQ) or session control message from a LAC to establish an L2TP session. An AVP in the ICRQ control message indicates the session type to be transmitted from the LAC. At block 603, the LNS determines if the session request control message indicates Ethernet. If the control message does indicate Ethernet, then a virtual circuit structure is created indicating Ethernet encapsulation at block 607. Otherwise, the LNS creates a virtual circuit structure at block 605 indicating a different encapsulation. At block 608 the LNS receives an L2TP data packet over the session. When the LNS receives the L2TP packet from the session, a decapsulation routine removes the L2TP header from the packet to get a payload at block 609. The LNS then associates the decapsulated payload with the virtual circuit structure at block 611. The LNS processes the payload as indicated by the virtual circuit structure at block 613. If the virtual circuit indicates Ethernet encapsulation, the virtual circuit structure creates the impression to the system of the LNS that the payload is a data packet received on an Ethernet port. If the virtual circuit structure indicates a different encapsulation, then it creates the impression to the LNS system that the payload was received on a circuit configured for the different encapsulation.

The capability to transmit Ethernet frames over L2TP tunnels increases functionality of a network element supporting this extension to L2TP. This extension of L2TP covers the two network layer protocols most likely employed by subscribers. The wholesale network provider can employ L2TP to provide ISP customers individual data streams for each subscriber accessing the network through the wholesale network provider's network element. L2TP also enables a network provider with robust signaling functionality. With L2TP, the network provider can satisfy a customer request for certain information to be passed as AVPs. The flexibility of L2TP allows the network provider to add and remove AVPs in response to the changing needs of customers. Other protocols such as GRE do not support this signaling functionality. Moreover, additional protocols are unnecessary as with BCP.

In addition, GRE is limited to IP media which is more complex and has more overhead than other media such as Frame Relay. In contrast, L2TP can be carried over any media.

The techniques shown in the figures can be implemented using code and data stored and executed on computers. Such computers store and communicate (internally and with other computers over a network) code and data using machine-readable media, such as magnetic disks; optical disks; random access memory; read only memory; flash memory devices; electrical, optical, acoustical or other form of propagated signals (e.g., carrier waves, infrared signals, digital signals, etc.); etc. Of course, one or more parts of the invention may be implemented using any combination of software, firmware, and/or hardware.

While the invention has been described in terms of several embodiments, those skilled in the art will recognize that the invention is not limited to the embodiments described. In an alternative embodiment, the data stored in an Ethernet header can be transmitted instead of the Ethernet frame. The Ethernet payload could be decapsulated from the Ethernet frame. The data in the Ethernet frame could be stored as values in the L2TP header. Hence, the Ethernet information could be transmitted with L2TP instead of encapsulating the Ethernet frame with L2TP. In another embodiment of the invention, Ethernet could be transmitted over L2TP and PPP. A virtual PPP client would run on the LAC. The Ethernet frame could be encapsulated with the virtual PPP client, and the Ethernet frame transmitted within PPP encapsulation without extending L2TP.

The method and apparatus of the invention can be practiced with modification and alteration within the spirit and scope of the appended claims. The description is thus to be regarded as illustrative instead of limiting on the invention

The invention claimed is:

1. A machine readable medium that provides instructions, which when executed by a set of processors, cause said set of processors to perform operations comprising:

transmitting a first tunnel control message for Layer 2 Tunneling Protocol (L2TP) tunnel setup having an attribute value pair (AVP) indicating Ethernet frame capability, receiving a second tunnel control message for L2TP tunnel setup having an AVP indicating Ethernet frame capability;

transmitting a session control message having an AVP indicating an L2TP Ethernet session and an AVP indicating an Ethernet Media Access Control (MAC) address; and transmitting an Ethernet frame with the L2TP Ethernet session.

2. The machine readable medium of claim 1 further comprising performing session fail retry before transmitting the Ethernet frame.

3. The machine readable medium of claim 1 wherein transmitting the first and second tunnel control messages comprises manipulating the bits of the first and second tunnel control messages.

4. A machine readable medium that provides instructions, which when executed by a set of processors, cause said set of processors to perform operations comprising:

establishing an Ethernet capable Layer 2 Tunneling Protocol (L2TP) tunnel, wherein establishing the Ethernet capable L2TP tunnel comprises, receiving a first tunnel control message indicating Ethernet capability; and transmitting a second tunnel control message indicating Ethernet frame capability;

accepting an L2TP session;

receiving an L2TP encapsulated Ethernet frame over the session;

decapsulating the Ethernet frame; and associating the Ethernet frame to a virtual circuit structure.

5. The machine readable medium of claim 4 wherein the tunnel is non-homogenous.

6. The machine readable medium of claim 4 further comprising extracting a set of data from the Ethernet frame.

7. A machine readable medium that provides instructions, which when executed by a set of processors, cause said set of processors to perform operations comprising:

receiving a first Layer 2 Tunneling Protocol tunnel control message having an attribute value pair (AVP) indicating Ethernet capability;

transmitting a second L2TP tunnel control message having an AVP indicating Ethernet capability;

receiving a session control message having an AVP indicating a session type and an Ethernet MAC address;

creating a virtual circuit structure for the session type in response to the session control message; and processing an L2TP packet having a payload with the virtual circuit structure.

8. The machine readable medium of claim 7 wherein processing the L2TP packet comprises:

decapsulating the payload from the L2TP packet; and processing the payload as indicated by the virtual circuit structure.

9. The machine readable medium of claim 7 wherein the first and second control messages include values requested by a customer.

10. An apparatus comprising:

a Layer 2 Tunneling Protocol (L2TP) Access Concentrator (LAC) to transmit an Ethernet frame over an L2TP tunnel, wherein the LAC to transmit the Ethernet frame comprises, establishing an L2TP tunnel capable of carrying an Ethernet over L2TP session; and establishing an Ethernet over L2TP session to an Layer 2 Tunneling Protocol Network Server (LNS), wherein establishing the tunnel capable of carrying an Ethernet over L2TP session comprises,
the LAC transmitting a first tunnel control message to the LNS indicating Ethernet frame capability, and
the LNS transmitting a second tunnel control message to the LAC indicating Ethernet frame capability;
the LNS to receive the Ethernet frame from the L2TP tunnel originating at the LAC.

11. The machine readable medium of claim 10 wherein the L2TP tunnel is non-homogenous.

12. The apparatus of claim 10 wherein the establishing the Ethernet over L2TP session to the LNS comprises the LAC transmitting to the LNS a session control message indicating Ethernet encapsulation and an Ethernet Media Access Control (MAC) address for the LAC.

13. A Layer 2 Tunneling Protocol (L2TP) Access Concentrator (LAC) comprising:
an operating system to establish an Ethernet capable L2TP tunnel with a peer, to perform session fail retry;
to establish an Ethernet over L2TP session in the tunnel, to encapsulate an Ethernet frame with L2TP, wherein the establish the Ethernet over L2TP session in the tunnel comprises:
transmitting a first tunnel control message indicating Ethernet frame capability; and
receiving a second tunnel control message indicating Ethernet frame capability; and
a circuit to transmit the session.

14. The LAC of claim 13 wherein to establish the Ethernet over L2TP session comprises transmitting signals, the signals including requested values.

15. The LAC of claim 13 wherein the tunnel is non-homogenous.

16. The LAC of claim 13 wherein to establish the Ethernet over L2TP session in the tunnel comprises transmitting a session control message indicating Ethernet encapsulation and an Ethernet MAC address for the LAC.

17. A Layer 2 Tunneling Protocol (L2TP) Network Server (LNS) comprising:
an operating system to establish an Ethernet capable L2TP tunnel, wherein the operating system to establish the Ethernet capable L2TP tunnel comprises,
receiving a first tunnel control message indicating Ethernet capability; and
transmitting a second tunnel control message indicating Ethernet capability;
a circuit to receive an Ethernet over L2TP packet having an Ethernet frame as a payload; and
a logic to process the packet.

18. The LNS of claim 17 wherein the tunnel is non-homogenous.

19. A computer implemented method comprising:
transmitting a first tunnel control message for Layer 2 Tunneling Protocol (L2TP) tunnel setup having an attribute value pair (AVP) indicating Ethernet frame capability,
receiving a second tunnel control message for L2TP tunnel setup having an AVP indicating Ethernet frame capability;
transmitting a session control message having an AVP indicating an L2TP Ethernet session and an Ethernet Media Access Control (MAC) address; and
transmitting an Ethernet frame with the L2TP Ethernet session.

20. The method of claim 19 further comprising performing AAA retry before transmitting the Ethernet frame.

21. The method of claim 19 wherein transmitting the first and second tunnel control messages comprises manipulating the bits of the first and second tunnel control messages.

22. A method comprising:
transmitting a first tunnel control message for Layer 2 Tunneling Protocol (L2TP) tunnel setup having an attribute value pair (AVP) indicating Ethernet frame capability, receiving a second tunnel control message for L2TP tunnel setup having an AVP indicating Ethernet frame capability;
transmitting a session control message having an AVP indicating an L2TP Ethernet session and an AVP indicating an Ethernet Media Access Control (MAC) address; and
transmitting an Ethernet frame with the L2TP Ethernet session.

23. The method of claim 22, further comprising performing session fail retry before transmitting the Ethernet frame.

24. The method of claim 22, wherein transmitting the first and second tunnel control messages comprises manipulating the bits of the first and second tunnel control messages.

25. A method comprising:
establishing an Ethernet capable Layer 2 Tunneling Protocol (L2TP) tunnel, wherein establishing the Ethernet capable L2TP tunnel comprises:
receiving a first tunnel control message indicating Ethernet capability; and
transmitting a second tunnel control message indicating Ethernet frame capability;
accepting an L2TP session;
receiving an L2TP encapsulated Ethernet frame over the session;
decapsulating the Ethernet frame; and
associating the Ethernet frame to a virtual circuit structure.

26. The method of claim 25, wherein the tunnel is non-homogenous.

27. The method of claim 25, further comprising extracting a set of data from the Ethernet frame.

28. A method comprising:
receiving a first Layer 2 Tunneling Protocol tunnel control message having an attribute value pair (AVP) indicating Ethernet capability;
transmitting a second L2TP tunnel control message having an AVP indicating Ethernet capability;
receiving a session control message having an AVP indicating a session type and an Ethernet MAC address;
creating a virtual circuit structure for the session type in response to the session control message; and
processing an L2TP packet having a payload with the virtual circuit structure.

29. The method of claim 28, wherein processing the L2TP packet comprises:
decapsulating the payload from the L2TP packet; and
processing the payload as indicated by the virtual circuit structure.

30. The method of claim 28, wherein the first and second control messages include values requested by a customer.

* * * * *